(12) United States Patent
Tien

(10) Patent No.: US 6,811,228 B2
(45) Date of Patent: Nov. 2, 2004

(54) WHEEL HAVING SPOKE SOLIDLY COUPLING DEVICE

(76) Inventor: Tseng Ping Tien, P.O. Box 63-99, Taichung (TW), 406

( * ) Notice: Subject to any disclaimer, the term of this patent is extended or adjusted under 35 U.S.C. 154(b) by 2 days.

(21) Appl. No.: 10/335,756

(22) Filed: Dec. 31, 2002

(65) Prior Publication Data

US 2004/0124694 A1 Jul. 1, 2004

(51) Int. Cl.[7] .................... B60B 1/02; B60B 21/06; B60B 9/26
(52) U.S. Cl. ..................... 301/58; 301/61; 301/104
(58) Field of Search ........................... 301/55, 58, 61, 301/95, 101, 104

(56) References Cited

U.S. PATENT DOCUMENTS

| | | | | |
|---|---|---|---|---|
| 5,673,976 A | * | 10/1997 | Hillis et al. .................... 301/58 |
| 5,769,584 A | * | 6/1998 | Claes .......................... 301/58 |
| 5,806,935 A | * | 9/1998 | Shermeister .................. 301/58 |
| 6,189,978 B1 | * | 2/2001 | Lacombe et al. ............ 301/104 |
| 6,205,664 B1 | * | 3/2001 | Cappellotto ................... 301/58 |
| 6,378,953 B2 | * | 4/2002 | Mercat et al. ................. 301/58 |
| 6,497,042 B1 | * | 12/2002 | Dietrich ....................... 301/58 |

* cited by examiner

Primary Examiner—Russell D. Stormer
Assistant Examiner—Jason R. Bellinger

(57) ABSTRACT

A wheel for cycles includes a wheel rim having a number of orifices each formed by a peripheral flange, a number of couplers engaged into the orifices of the wheel rim and each having a screw hole threaded with fasteners. A number of spokes each has one end engaged through the bore of the fasteners and engaged with lock members which may anchor the spokes to the fasteners, and to secure the spokes to the couplers. The ends of the spokes may thus be easily secured to the wheel rim without forming any threaded or screw holes in the wheel rim.

5 Claims, 4 Drawing Sheets

WHEEL HAVING SPOKE SOLIDLY COUPLING DEVICE

BACKGROUND OF THE INVENTION

1. Field of the Invention

The present invention relates to a wheel for cycles, and more particularly to a wheel having a coupling device for solidly coupling spokes to wheel rim.

2. Description of the Prior Art

Typical wheels for cycles comprise a number of spokes to be secured between a wheel rim and a central hub. The wheel rim includes a number of orifices formed in the inner peripheral portion thereof for slidably receiving the spokes, and a number of lock nuts are engaged with the spokes, in order to secure the spokes to the wheel rim. However, the spokes may not be solidly secured to the wheel rim because the spokes do not engage with or threaded to the wheel rim.

In order to solidly secure the spokes to the wheel rim, some of the wheels for cycles comprise a wheel rim including a number of screw holes formed in the inner peripheral portion thereof for threading with the threaded portions of the spokes and for allowing the spokes to be secured to the wheel rim. However, the wheel rim should be increased to a greater thickness for allowing the screw holes to be solidly formed in the wheel rim, and for allowing the spokes to be solidly secured to the wheel rim. Relatively, the wheel rim of greater thickness may also greatly increase the weight of the wheel.

The present invention has arisen to mitigate and/or obviate the afore-described disadvantages of the conventional wheel rim and spoke securing structures for cycle wheels.

SUMMARY OF THE INVENTION

The primary objective of the present invention is to provide a wheel for cycles having a coupling device for solidly coupling spokes to wheel rim without forming screw holes in the wheel rim.

In accordance with one aspect of the invention, there is provided a wheel for cycles comprising a wheel rim including an inner peripheral portion having a plurality of orifices formed therein and each defined by a peripheral flange, a plurality of couplers engaged into the orifices of the wheel rim respectively, and each including a screw hole formed therein, a plurality of fasteners threaded with the screw holes of the couplers respectively, and each including a bore formed therein, a plurality of spokes each including a first end engaged through the bore of the fasteners respectively, and a plurality of lock members secured to the first ends of the spokes and engaged with the fasteners, to anchor the spokes to the fasteners, and to secure the spokes to the couplers respectively. The first ends of the spokes may thus be easily and quickly secured to the wheel rim without forming any threaded or screw holes in the wheel rim.

The fasteners each includes an inner peripheral portion having a peripheral protuberance extended radially into the bore thereof and anchored with the lock members.

The couplers each includes a middle portion having an outer peripheral groove formed therein to receive the peripheral flange of the wheel rim respectively.

The couplers each includes a first end having at least one slot formed therein to define at least one spring blade, for allowing the first end of the coupler to engage through either of the orifices of the wheel rim. The first ends of the couplers each includes an inclined outer peripheral surface for facilitating an engagement of the first end of the couplers into the orifices of the wheel rim.

The couplers each includes a second end having an outer diameter greater than an inner diameter of the orifices of the wheel rim, to engage with the peripheral flanges of the wheel rim and to anchor the couplers to the wheel rim.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
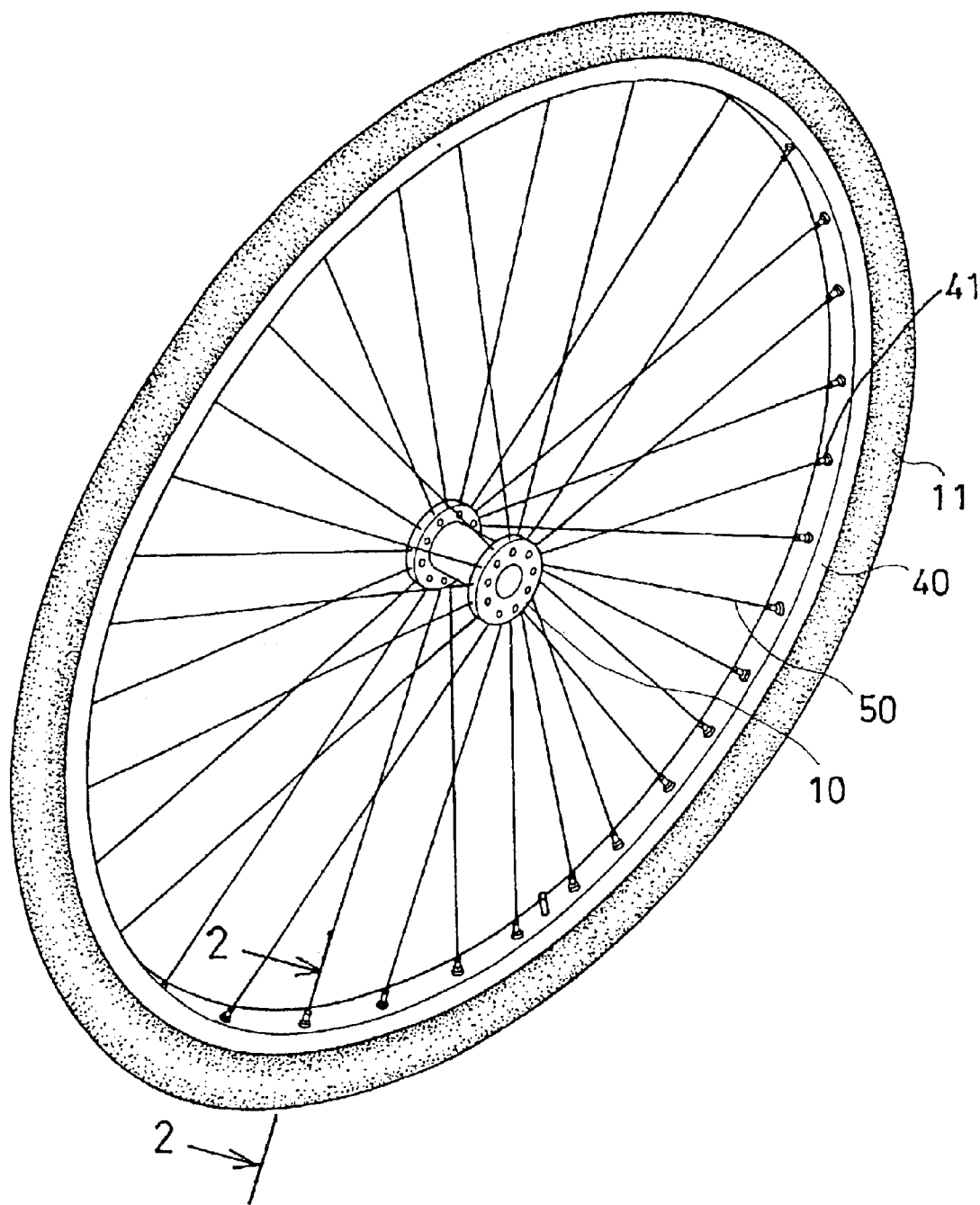
FIG. 1 is a perspective view of a wheel for cycles in accordance with the present invention.
Figure 3:
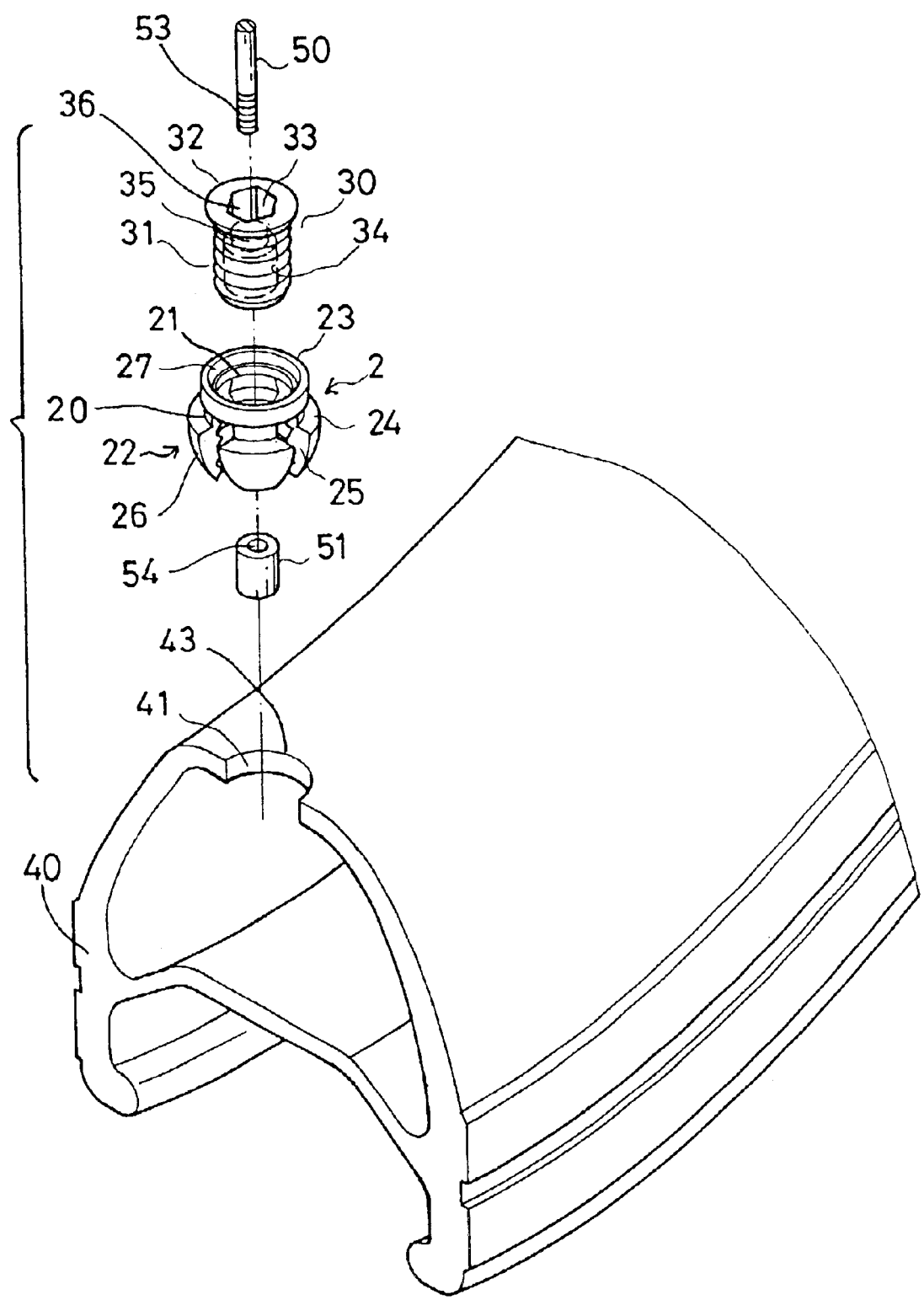
FIG. 3 is a partial exploded view of the wheel for cycles.
Figure 4:
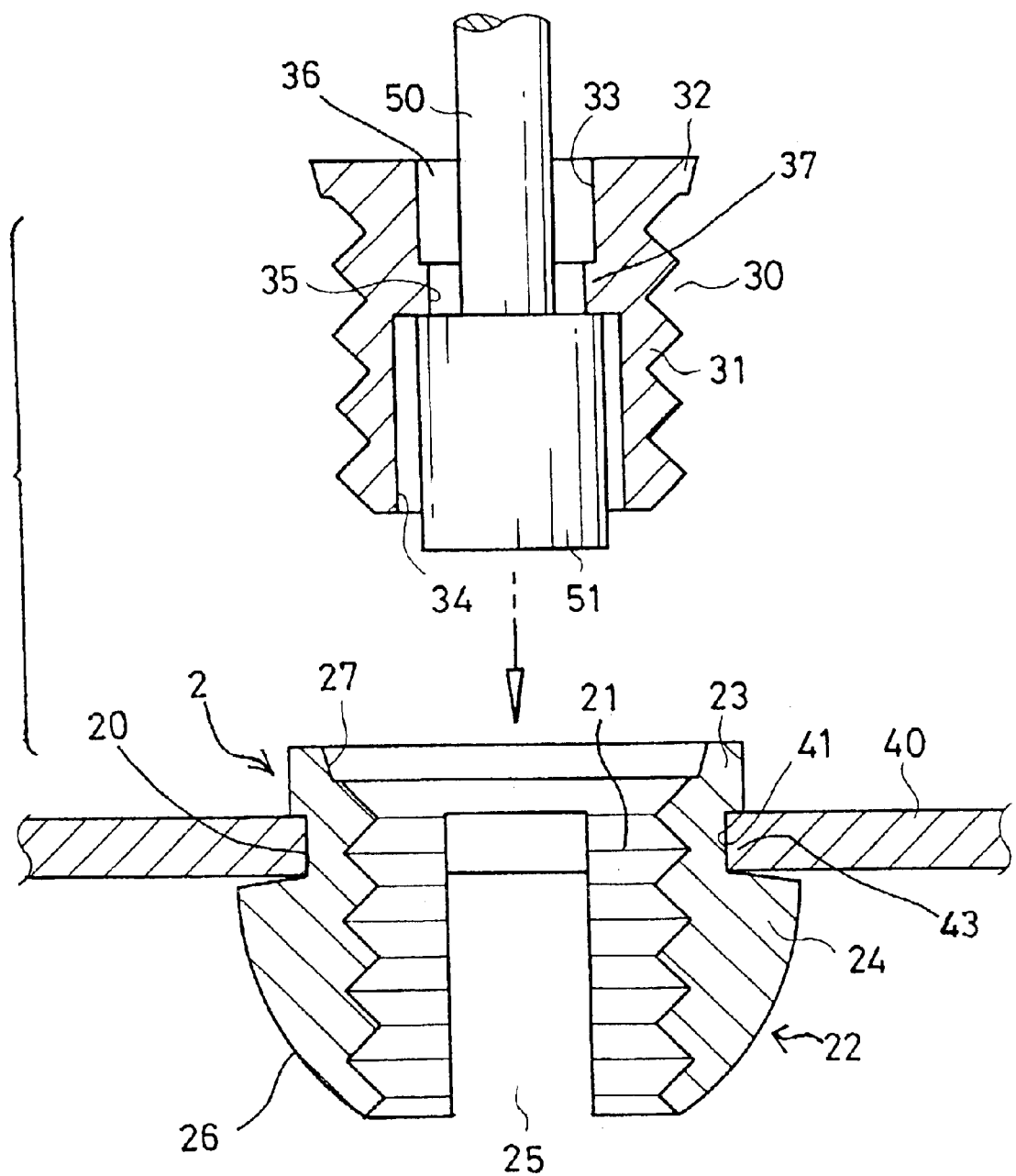
FIG. 4 is a partial cross sectional and partial exploded view, illustrating the securing of the spoke to the wheel rim.

Referring to the drawings, and initially to FIG. 1, a wheel for cycles in accordance with the present invention comprises a number of spokes 50 to be secured between a wheel rim 40 and a central hub 10. The wheel rim 40 includes a number of orifices 41 formed in the inner peripheral portion thereof and each defined by a peripheral flange 43 (FIGS. 3, 4). A tire 11 is attached onto the outer peripheral portion of the wheel rim 40 for forming the wheel for cycles.

Figure 2:
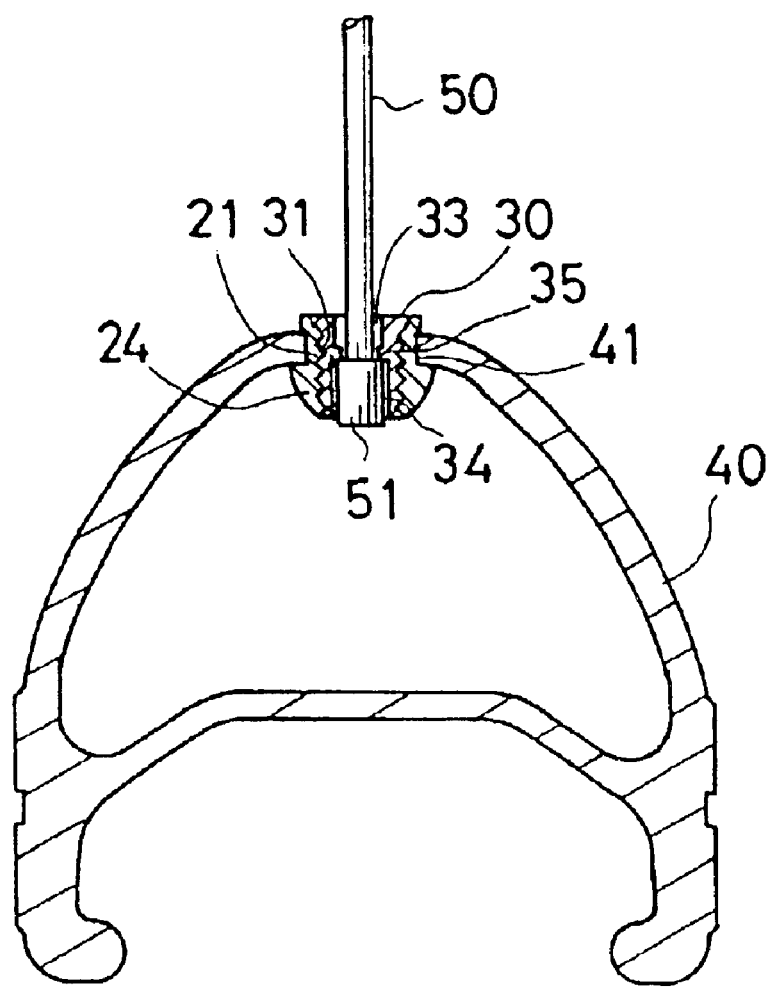
FIG. 2 is a cross sectional view taken along lines 2—2 of FIG. 1.

Referring next to FIGS. 2–4, a number of couplers 2 each includes an outer peripheral groove 20 formed in a middle portion thereof, or formed between a lower portion 22 and an upper portion 23 thereof for receiving the corresponding peripheral flanges 43 of the wheel rim 40. The upper portion 23 of the coupler 2 includes an outer diameter greater than the inner diameter of the orifices 41 of the wheel rim 40, for engaging with the peripheral flanges 43 of the wheel rim 40 (FIG. 4) and for securing the coupler 2 to the wheel rim 40.

The couplers 2 each includes one or more slots 25 formed in the lower portion 22 thereof for forming or defining one or more spring blades 24, and for allowing the spring blades 24 of the lower portion 22 of the coupler 2 to be engaged through the orifices 41 of the wheel rim 40, and thus for allowing the peripheral flanges 43 of the wheel rim 40 to be engaged into the outer peripheral groove 20 of the coupler 2.

As best shown in FIG. 4, the spring blades 24 or the lower portion 22 of the coupler 2 also includes an outer diameter greater than the inner diameter of the orifices 41 of the wheel rim 40, for engaging with the peripheral flanges 43 of the wheel rim 40 (FIG. 4), and thus for solidly securing the coupler 2 to the wheel rim 40. The coupler 2 includes an angled or inclined or curved outer peripheral surface 26 formed on the outer peripheral portion of the lower portion 22 thereof, for allowing the spring blades 24 to be easily engaged through the orifice 41 of the wheel rim 40.

The couplers 2 each further includes a screw hole 21 formed therein, and each includes a recess 27 formed in the upper portion thereof, and communicating with the screw hole 21 thereof. The recess 27 of each coupler 2 preferably includes an inner diameter no less then or greater than the inner diameter of the screw hole 21 of the coupler 2.

A number of fasteners 30 each includes an outer thread 31 formed and provided on the outer peripheral portion thereof for engaging with or for threading with the screw hole 21 of the coupler 2, and thus for detachably securing the fastener 30 to the respective coupler 2, and each includes a peripheral rib 32 extended radially and outwardly from the upper portion thereof for engaging into the recess 27 of the coupler 2.

The fasteners 30 each includes a bore 33 formed therein, and a peripheral protuberance 37 extended radially and inwardly from the inner portion thereof and extended into the bore 33 thereof, for forming or defining a lower chamber 34 and an upper chamber 36, and a reduced passage 35 formed in the middle portion thereof and communicating with the upper and the lower chambers 36, 34 thereof.

The spokes 50 each includes a threaded end 53 engaged through the bore 33 of the respective fastener 30, and threaded with an inner thread 54 of one of a number of lock nuts 51 which may thus be detachably secured to the respective threaded end 53 of the spoke 50. The lock nut 51 may be engaged or received in the lower chamber 34 of the fastener 30, and may include an outer diameter greater than the inner diameter of the passage 35 of the fastener 30, for allowing the spoke 50 to be secured or latched or anchored to the fastener 30 with the lock nut 51.

The upper chamber 36 of the fastener 30 includes a non-circular cross section, such as a hexagonal cross section (FIG. 3), for receiving tool members (not shown), and for allowing the fasteners 30 to be rotated or driven relative to wheel rim 40 and the couplers 2 respectively, and thus to be threaded or secured to the couplers 2 with the tool members.

It is to be noted that the couplers 2 may be easily engaged through or into the orifices 41 of the wheel rim 40, and may be easily secured to the wheel rim 40, without forming screw holes or inner threads in the wheel rim 40. The spokes 50 may then be detachably secured to the couplers 2 by threading the fasteners 30 to the couplers 2 respectively. The couplers 2 and the fasteners 30 may thus form a coupling device for solidly and detachably securing the spokes to the wheel rim 40.

Accordingly, the wheel for cycles in accordance with the present invention includes a coupling device for solidly coupling spokes to wheel rim without forming screw holes in the wheel rim.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A wheel for cycles comprising:

a wheel rim including an inner peripheral portion having a plurality of orifices formed therein and each defined by a peripheral flange, a plurality of couplers engaged into said orifices of said wheel rim respectively, and each including a screw hole formed therein, a plurality of fasteners threaded with said screw holes of said couplers respectively, and each including a bore formed therein, and each including an inner peripheral portion having a peripheral protuberance extended radially into said bore thereof, a plurality of spokes each including a first end engaged through said bore of said fasteners respectively, and a plurality of lock members secured to said first ends of said spokes and engaged with said peripheral protuberances of said fasteners, to anchor said spokes to said fasteners, and to secure said spokes to said couplers respectively.

2. A wheel for cycles comprising:

a wheel rim including an inner peripheral portion having a plurality of orifices formed therein and each defined by a peripheral flange, a plurality of couplers engaged into said orifices of said wheel rim respectively, and each including a screw hole formed therein, and each including a middle portion having an outer peripheral groove formed therein to receive said peripheral flange of said wheel rim respectively, a plurality of fasteners threaded with said screw holes of said couplers respectively, and each including a bore formed therein, a plurality of spokes each including a first end engaged through said bore of said fasteners respectively, and a plurality of lock members secured to said first ends of said spokes and engaged with said fasteners, to anchor said spokes to said fasteners, and to secure said spokes to said couplers respectively.

3. A wheel for cycles comprising:

a wheel rim including an inner peripheral portion having a plurality of orifices formed therein and each defined by a peripheral flange, a plurality of couplers engaged into said orifices of said wheel rim respectively, and each including a screw hole formed therein, and each including a first end having at least one slot formed therein to define at least one spring blade, for allowing said first end of said coupler to engage through either of said orifices of said wheel rim, a plurality of fasteners threaded with said screw holes of said couplers respectively, and each including a bore formed therein, a plurality of spokes each including a first end engaged through said bore of said fasteners respectively, and a plurality of lock members secured to said first ends of said spokes and engaged with said fasteners, to anchor said spokes to said fasteners, and to secure said spokes to said couplers respectively.

4. The wheel as claimed in claim 3, wherein said first ends of said couplers each includes an inclined outer peripheral surface for facilitating an engagement of said first end of said couplers into said orifices of said wheel rim.

5. A wheel for cycles comprising:

a wheel rim including an inner peripheral portion having a plurality of orifices formed therein and each defined by a peripheral flange, a plurality of couplers engaged into said orifices of said wheel rim respectively, and each including a screw hole formed therein, and each including a second end having an outer diameter greater than an inner diameter of said orifices of said wheel rim, to engage with said peripheral flanges of said wheel rim and to anchor said couplers to said wheel rim, a plurality of fasteners threaded with said screw holes of said couplers respectively, and each including a bore formed therein, a plurality of spokes each including a first end engaged through said bore of said fasteners respectively, and a plurality of lock members secured to said first ends of said spokes and engaged with said fasteners, to anchor said spokes to said fasteners, and to secure said spokes to said couplers respectively.

* * * * *